Figure 1:
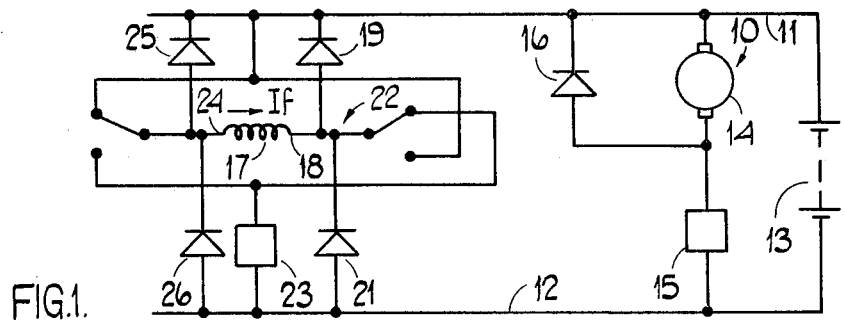

United States Patent [19]

Boxer

[11] 4,049,998
[45] Sept. 20, 1977

[54] CONTROL CIRCUIT FOR AN ELECTRICALLY DRIVEN VEHICLE

[75] Inventor: Trevor Charles Boxer, Birmingham, England

[73] Assignee: Joseph Lucas Limited, Birmingham, England

[21] Appl. No.: 614,674

[22] Filed: Sept. 18, 1975

[51] Int. Cl.² .......................................... H02P 3/12
[52] U.S. Cl. .................... 318/258; 318/261; 318/139
[58] Field of Search ............... 318/139, 258, 261, 273, 318/296, 300, 364, 375, 376, 381

[56] References Cited

U.S. PATENT DOCUMENTS

| | | | |
|---|---|---|---|
| 3,548,279 | 12/1970 | Knasinski et al. | 318/258 |
| 3,584,281 | 6/1971 | Reeves et al. | 318/258 |
| 3,735,220 | 5/1973 | Renner et al. | 318/139 |
| 3,944,898 | 3/1976 | Wright | 318/258 |

Primary Examiner—Robert K. Schaefer
Assistant Examiner—W. E. Duncanson, Jr.

[57] ABSTRACT

A control circuit for an electrically driven vehicle which employs a separately excited motor. The armature is connected in series with a current control between two supply rails. The field winding is likewise connected between the rails, but has associated with it switch means for reversing the connection of the field winding. A diode arrangement is provided for recirculating current when the field circuit is interrupted and for establishing a recirculating path through the vehicle battery when the field connections are reversed, by the switch means.

4 Claims, 4 Drawing Figures

CONTROL CIRCUIT FOR AN ELECTRICALLY DRIVEN VEHICLE

This invention relates to a control circuit for an electrically driven vehicle.

A control circuit, according to the invention, includes positive and negative supply lines for connection to a traction battery on the vehicle, a motor having an armature and a separately excited field winding connected between said positive and negative supply lines so that, in use, the motor is powered by the battery to drive the vehicle, at least one recirculating diode connected in circuit with the field winding, first means operable to reverse the connections between the ends of the field winding and the positive and negative supply lines respectively so that, in use, the direction of current flow through the field winding can be reversed, and second means which, in use, on operation of said first means, temporarily connects a load in a series circuit including the field winding until the flux in the field winding has decayed substantially to zero, the load opposing the flow of current in said circuit so as to increase the rate of decay of said flux above that with the recirculating diode alone and thereby allow rapid reversal of the field current.

Preferably, said first means includes first switch means which in a first operative position connects one side of the field winding to the positive supply line and the other side of said winding to the negative supply line and which in a second operative position connects said one side of said winding to the negative supply line and said other side of the positive supply line.

Conveniently, said second means is operable to temporarily connect said load in series with the field winding in response to movement of said first switch means from one of said operative positions to the other operative position.

Alternatively, said first means also includes control means and further switch means operable by said control means, when current from the battery is flowing in use in one direction through the field winding, to temporarily prevent further flow of current from the battery and connect said load in said series circuit including the field winding until the flux in the field winding has decayed substantially to zero, said control means thereafter operating the first switch means so current from the battery the flows in the opposite direction through the field winding.

Preferably, said load is the vehicle battery.

Preferably, the circuit includes a field controller in circuit with the field winding for regulating the current flow through the field winding.

Figure 2:
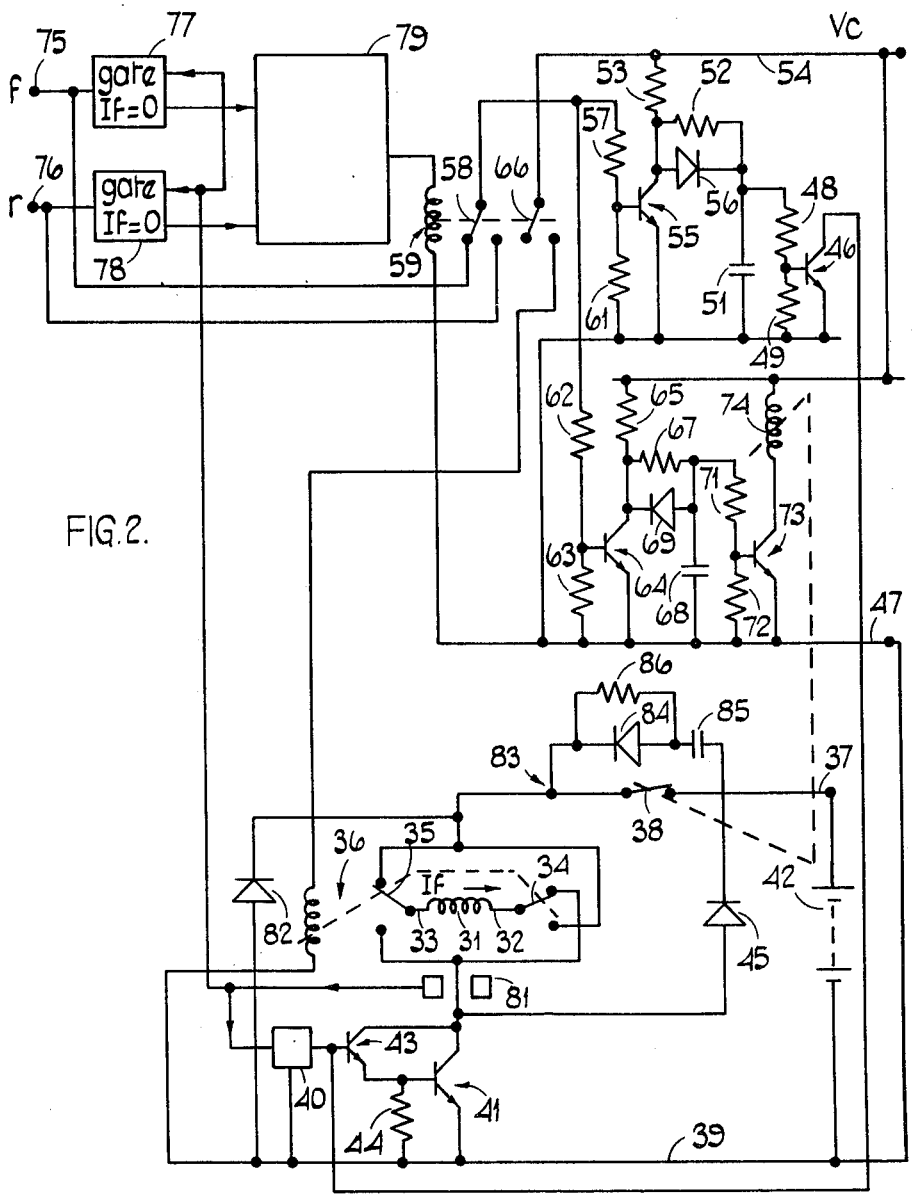
Figure 3:
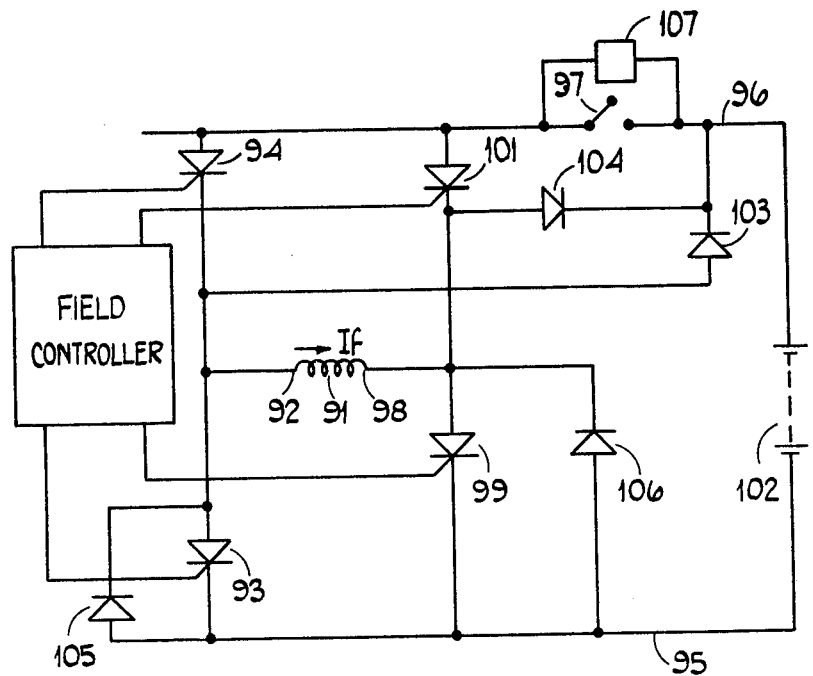
Figure 4:
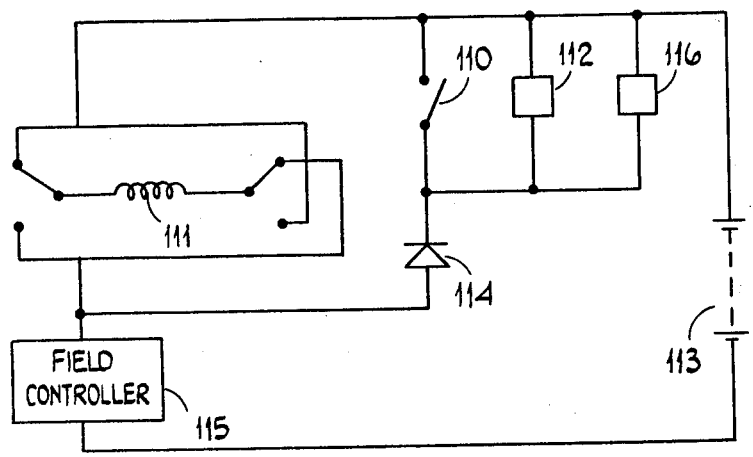

In the accompanying drawings:

FIG. 1 is a circuit diagram of part of a control circuit according to a first example of the invention when in use in an electrically driven vehicle, FIG. 2 is a circuit diagram of the field control circuit of an arrangement according to a second example of the invention, FIG. 3 is a circuit diagram of part of the field control circuit of an arrangement according to a third example, and FIG. 4 is a circuit diagram similar to FIG. 3 illustrating a fourth example.

Referring to FIG. 1, the circuit of the first example includes positive and negative supply lines 11, 12 respectively which are connected to a traction battery 13 on the vehicle. Connected to the supply line 11 is one side of the armature 14 of a separately excited motor 10 which, in use, is powered by the battery 13 to drive the vehicle. The other side of the armature 14 is connected by way of an armature controller 15 to the supply line 12 and a recirculating diode 16 is connected across the armature 14. In use, when the vehicle is being driven, the controller 15 senses the current flowing through the armature 14 and maintains the armature current below a predetermined maximum level. The value of this maximum level is dependent upon the position of the vehicle accelerator pedal which is, of course, controlled by the driver of the vehicle. When the armature current reaches said maximum level, contacts (not shown) in the controller 15 open so that the armature 14 is disconnected from the battery 13. Current, however, continues to flow through the armature 14 by way of the diode 16, this current gradually decaying to a predetermined minimum level, the value of which is also controlled by the position of the vehicle accelerator pedal. When the minimum level is reached, the contacts of the controller 15 close so that current from the battery 13 again flows through the armature 14.

The field winding 17 of the motor 10 is connected at one end 18 to the anode of a diode 19 and the cathode of a diode 21, the cathode of the diode 19 being connected to the supply line 11 and the anode of the diode 21 being connected to the supply line 12. The end 18 of the winding 17 is also connected to one of two movable contacts of a reversing switch 22 which in a first operative position connects the end 18 to the line 12 by way of a field controller 23 and in a second operative position connects the end 18 to the supply line 11. The other movable contact of the switch 22 is connected to the other end 24 of the winding 17 so that in said first operative position the end 24 is connected to the supply line 11 while in said second operative position the end 24 is connected by way of the controller 23 to the line 12. In addition, the end 24 of the winding 17 is connected to the anode of a diode 25 and the cathode of a diode 26, the other terminals of the diodes 25, 26 being connected to the lines 11, 12 respectively.

In use, the field controller 23 functions in a similar way to the armature controller 15 to maintain the current flowing through the field winding 17 between maximum and minimum levels dependent upon the position of the vehicle accelerator pedal. Thus, assuming the vehicle is being driven forwardly and that in this situation the switch 22 is in its first operative position, current flows through the winding 17 in the direction indicated by the arrow $I_f$ in FIG. 1 until the current reaches said maximum value. At this point, the controller 23 stops conducting, but current continues to flow through the winding 17 by way of the diode 19 which acts as a recirculating diode until the current decays to said minimum value at which point the controller 23 again connects the winding 17 to the battery 13. If, during this cycle, it is required to reverse the direction of flow of the field current, either to effect braking or else to drive the vehicle backwards, then means (not shown) is operated to move the switch 22 into its second operative position. The connections between the ends 18, 24 of the winding and the supply lines 11, 12 are thereby reversed so that the flux in the winding 17 generated by the current flowing in the direction $I_f$ begins to decay. Moreover, it will be seen that when the switch 22 is moved into its second position, the current induced by the collapse of flux in the winding 17 can only flow in the circuit defined by the winding 17, the diode 19, the battery 13 and the diode 26. Of course, the battery 13 opposes this flow of current and hence produces a more rapid decay of flux in the winding 17 than is produced if the battery 13 is absent from the discharge path of the winding 17. When the flux in the winding 17 has collapsed substantially to zero, the arrangement is such that the controller 23 again permits current to flow from the battery 13 through the winding 17, although now of course in the reverse direction. It will therefore be appreciated that the circuit described above enables a rapid reversal in the direction of field current.

If the switch 22 is in its second position so that the vehicle is being either driven backwards, or regeneratively braked operation of the controller 23 to step current flow in the winding 17 causes the diode 25 to act as recirculating diode. Movement of the switch into its first position the reverse the direction of the field current places the battery into the discharge path of the winding 17 by way of diodes 21, 25. Again, therefore rapid reversal of the field current results.

As shown in FIG. 2, the circuit of the second example, also controls operation of a separately excited motor for driving an electric vehicle but, for convenience, the drawing only shows the part of the circuit associated with the field winding 31 of the motor. The portion of the circuit associated with the control of the armature current of the motor is the same as the arrangement shown in FIG. 1. Referring to FIG. 2, the field winding 31 is connected at its opposite ends 32, 33 to a pair of movable contacts 34, 35 respectively of a relay 36. The contacts 34, 35 are movable between first and second operative positions and are shown in their first operative position in FIG. 2. Thus, it will be seen that when the contacts 34, 35 are in their first operative position the end 33 of the winding 31 is connected to a first positive supply line 37 by way of a normally closed relay contact 38, while the end 32 of the winding is connected by way of the collector-emitter path of n-p-n transistor 41 to a first negative supply line 39, these connections being reversed when the contacts 34, 35 are in their second operative position. In use, a traction battery 42 on the vehicle supplies power to the lines 37, 39 so that current can flow in the field winding 31. The direction of the field current then depends upon the position of the contacts 34, 35, FIG. 2 showing the contacts in their first operative position with the field current flowing in the direction of the arrow $I_f$.

The base of the transistor 41 is connected to the emitter of a further n-p-n transistor 43 and is connected by way of a resistor 44 to the supply line 39. The collector of the transistor 43 is connected to the collector of the transistor 41 and to the anode of a diode 45, the cathode of which is connected to the supply line 37. The base of the transistor 43 is connected to the collector of a transistor 46 and to a field controller 40 which, as in the previous example, regulates the flow of current through the field winding 31 in accordance with the position of the accelerator pedal of the vehicle. The emitter of the transistor 46 is connected to a second negative supply line 47, which for convenience is connected to the supply line 39 and the base of the transistor 46 is connected to the junction between a pair of resistors 48, 49 connected in series across a capacitor 51. One plate of the capacitor 51 is connected to the supply line 47, while the other plate is connected by way of a pair of series resistors 52, 53 to a second positive supply line 54. The junction between the resistors 52, 53 is connected to the collector of an n-p-n transistor 55, while the resistor 52 is bridged by a diode 56. The transistor 55 has its emitter connected to the supply line 47 and its base connected by way of a resistor 57 to a first movable contact 58 of a relay 59, the base and emitter of the transistor 55 being bridged by a resistor 61. The base of the transistor 55 is also connected by way of a series circuit including the resistor 57 and further resistors 62, 63 to the supply line 47, the junction between resistors 62, 63 being connected to the base of an n-p-n transistor 64. Connected to the collector of the transistor 64 is one end of a resistor 65 the other end of which is connected to the supply line 54 which in turn is connected to a second movable contact 66 of the relay 59. The emitter of the transistor 64 is connected to the supply line 47 and connected across the collector-emitter path of the transistor 64 is a resistor 67 and a capacitor 68, the resistor 67 being bridged by a diode 69. The junction of the resistor 67 and capacitor 68 is connected to the supply line 47 by way of a pair of series resistors 71, 72, the junction of which is connected to the base of an n-p-n transistor 73. The collector of the transistor 73 is connected to the supply line 54 by way of a relay coil 74 associated with the contacts 38 while the emitter of the transistor 73 is connected to the supply line 47.

The contacts 58 of the relay 59 is normally connected to a first input terminal 75, but on energisation of the associated relay coil is moved to an operated position in which it is connected to a second input terminal 76. In use, a positive demand signal is supplied to the terminal 75 when it is required to drive the vehicle in a forward direction, whereas a similar signal is supplied to the terminal 76 when it is required to drive the vehicle in reverse. The terminals 75, 76 are connected by way of respective gates, 77, 78 to a bistable 79, the output of which is fed to one end of the coil of the relay 59, the other end of the coil being connected to the supply line 47. The gates 77, 78 receive inputs from a hall Effect Probe 81 which monitors the current flowing through the field winding 31 and which also provides an input to the field controller 40.

The contact 66 of the relay 59 is normally in an open position, but is movable upon energisation of the relay 59 to a closed position to connect one end of the coil of the relay 36 to the supply line 54, the other end of the relay 36 being connected to the supply line 39. The arrangement of the relay 36 is such that the contacts 34, 35 are normally in said first operative position but are movable, on energisation of the relay, to said second operative position, whereby, as described in detail below, the direction of current flow through the winding 31 is reversed.

The circuit also includes a diode 82 which has its anode connected to the supply line 39 and its cathode connected to the supply line 37 by way of the relay contacts 38, the latter being bridged by a damping circuit 83. The circuit 83 includes a diode 84 and a capacitor 85 connected in series across the contacts 38, with the diode 84 being bridged by a resistor 86.

In use, when it is required to drive the vehicle in a forward direction, a positive demand signal is supplied to the terminal 75 which sets the bistable 79 in a first state such that the relay 59 and therefore the relay 36 are not energised and the contacts 34, 35 are in their first operative position. Moreover, the positive signal at the terminal 75 switches on the transistors 55, 64 so that the transistors 46, 73 are held off. The relay coil 74 is therefore not energised so that the contacts 38 are closed. Current is then able to flow from the battery 42 through the field winding 31 in the direction of the arrow $I_f$ since, when the transistor 46, 73 are off, the controller 40 maintains the transistors 43, 41 in their on condition provided the current flow in the winding 31, as sensed by the probe 81, does not exceed the set maximum value. The controller 40 is conveniently a transistor controller and, when the field current exceeds said maximum value, turns off the transistors 43, 41. The supply of field current from the battery 42 is thereby prevented, the current which continues to flow through the winding 31 then decaying through the diode 45 until the set minimum value is reached and the controller 47 again turns on the transistors 43, 41.

When it is required to reverse the direction of field current, the signal at the terminal 75 is removed and is replaced by a positive demand signal at the terminal 76. Disappearance of the demand signal at the terminal 75 removes the supply of base current to the transistors 55, 64 which therefore turn off. The capacitor 51 then charges substantially immediately through the diode 56 to allow the transistor 46 to turn on which then causes the transistors 41, 43 to turn off and prevent the further supply of field current from the battery 42. After a delay governed by the time constant of the delay circuit defined by the resistors 65, 67 and the capacitor 68, the latter also becomes charged so allowing the transistor 73 to conduct. Current can therefore flow between the supply lines 54, 47 by way of the collector-emitter path of the transistor 73 to energise the relay coil 74 and open the relay contacts 38. As will become apparent from the ensuing description, at this stage the relay 36 remains unenergised so that the contacts 34, 35 are still in their first operative position. Thus, when the contacts 38 open, the current induced by the collapsing flux in the winding 31 can only flow in the circuit defined by the diode 45, the battery 42 and the diode 82. Again, therefore, the vehicle battery is placed in the discharge path of the field winding so that the rate of decay of the flux in the winding is increased. It is to be appreciated that the damping circuit 83 is provided across the contacts 38 to prevent sparking when the contacts are opened.

The discharge current flowing through the winding 31 as the flux in the winding decays is sensed by the probe 81 which is arranged to maintain the gate 78 closed until the current decays to zero. Thus, when the discharge current ceases to flow, the gate 78 opens whereby the bistable 79 is switched to its other state so that the relay 59 is energised. The contact 66 therefore moves to its closed position so that the relay 36 is energised and the contacts 34, 35 are moved to their second operative position. Energisation of the relay 59, also moves the contact 58 to its operated position whereby base current is again supplied to the transistors 55, 64 so that the latter again conduct. The transistor 73 therefore rapidly turns off since the capacitor 68 is able to discharge by way of the diode 69 whereby the relay coil 74 becomes de-energised and the contacts 38 again close. After a delay dependent on the time constant of the delay circuit defined by the capacitor 51 and the resistors 52, 53, the capacitor 51 also discharges so that the transistor 46 ceases to conduct. Thus, the transistors 43, 41 again turn on so that current from the battery 42 starts to flow through the field winding 31 once more, although now in the opposite direction to the arrow $I_f$. It is to be appreciated that when it is required to reverse the field current back to its initial direction, the circuit operates in a similar way to that described above, although now the gate 77 remains closed until the field winding has fully discharged.

Referring now to FIG. 3, in the control circuit of the third example reversal of the field current is effected by means of thyristors. Thus, the field winding 91 is connected at one end 92 to the anode of a thyristor 93 and the cathode of a thyristor 94, the cathode of the thyristor 93 being connected to a negative supply line 95 and the anode of the thyristor 94 being connected to a positive supply line 96 by way of a switch 97. At its other end 98, the winding 91 is connected to the anode of a thyristor 99 and the cathode of a thyristor 101, the cathode of the thyristor 99 being connected to the supply line 95 and the anode of the thyristor 101 being connected through the switch 97 to the line 96. The lines 95, 96 are connected to the traction battery 102 of the vehicle and control means (not shown) is connected to the gates of the thyristors 93, 94, 99, 101 to control conduction of the thyristors in use, commutating means (not shown) being provided for the thyristors 93, 99. Recirculating diodes 103, 104 are connected between the supply line 96 and the ends 92, 98 of the winding 91, while further diodes 105, 106 are connected across the thyristors 93, 99 respectively. Moreover, a damping circuit 107 is connected across the switch 97 to prevent sparking when the switch is opened and closed in use.

In the arrangement shown in FIG. 3, when the vehicle is being driven forwardly the switch 97 is closed and the control means is arranged so that the thyristors 94 and 99 are conducting. Thus current from the battery 102 flows through the field winding 91 in the direction of the arrow $I_f$. As in the previous examples the magnitude of the field current is regulated by a field controller (not shown) and, when the controller causes commutation of the thyristor 99 the current which continues to flow through the field winding can decay by way of the diode 104. Moreover, the arrangement of the circuit is such that when it is required to reverse the direction of the field current, the switch 97 is opened. Thus, assuming the field current is flowing in a direction $I_f$ when the switch 97 is opened to effect reversal, the current induced by the collapsing flux in the winding 91 is constrained to flow in the circuit defined by the diode 104, the battery 102, the diode 105 and the winding 91. Thus, once again, the battery is placed in the discharge path of the field winding so that the winding discharges rapidly. When the discharge current has ceased to flow, the arrangement of the circuit is such that the switch 97 closes and the thyristors 93, 101 are switched on so that field current again commences to flow, but now in the reverse direction.

As shown in FIG. 4, in the circuit of the fourth example when the current through the field winding 111 is to be reversed, a switch 110 opens temporarily to connect a load 112 separate from the vehicle battery 113 in a series circuit including the field winding 111 and a diode 114. Thus, again rapid reversal of the field current is possible. As in the previous examples, the circuit of FIG. 4 includes a field controller 115 to regulate the magnitude of the field current and a damping circuit 116 to prevent sparking when the switch 110 opens.

I claim:

1. A control circuit for an electrically driven vehicle having a battery and a motor with an armature and a separately excited field winding, comprising positive and negative supply lines for connecting the battery to the armature and the field winding, at least one current recirculating diode connected in circuit with the field winding to shunt the field current when the connection between the battery and the field winding is interrupted, a switching mode field current regulator, field current direction control means connected in series with the field winding between the supply lines, switch means connected in the path of the recirculating diode current and means for opening said switch means temporarily when a change of field current direction is required, opening of said switch means causing current flowing in the field winding as a result of collapsing flux therein to be diverted through the vehicle battery so as to increase the rate of decay of said flux above that with the recirculating diode alone thereby allowing rapid reversal of the field current.

2. A circuit as claimed in claim 1 further comprising field current direction selection means connected to control the field current direction control means and field current sensing means connected to said field current regulator for controlling switching thereof, said field current direction selection means including gate means connected to the field current sensing means so that when a current direction change is selected operation of the current direction control means is inhibited until the field current falls below a predetermined value.

3. A circuit as claimed in claim 2 in which said means for opening said switch is connected to said direction selection means so as to be controlled thereby.

4. A circuit as claimed in claim 1 including a damping circuit connected across said switch.

* * * * *